J. M. HICKS.
Burners for Fuel.
No. 200,139. Patented Feb. 12, 1878.
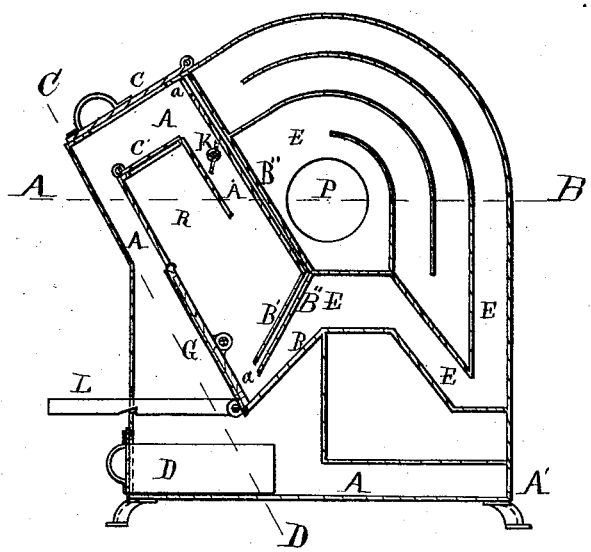
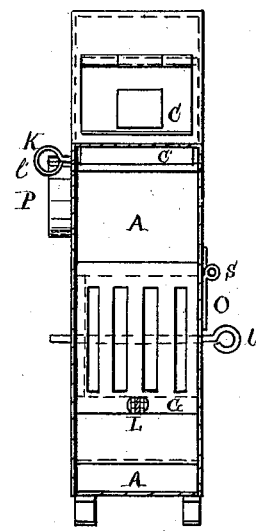
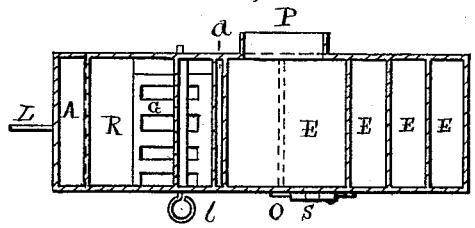
Witnesses
W. H. Hicks
William Jenkins
Inventor
Jas. M. Hicks

UNITED STATES PATENT OFFICE.

JAMES M. HICKS, OF SUMMIT, NEW JERSEY.

IMPROVEMENT IN BURNERS FOR FUEL.

Specification forming part of Letters Patent No. 200,139, dated February 12, 1878; application filed February 10, 1877.

*To all whom it may concern:*

Be it known that I, JAMES M. HICKS, of Summit, New Jersey, have invented Improvements in Burners for Fuel, of which the following is a specification, reference being had to the drawings which form part of this specification.

My invention relates to that class of burners where the course of the air and gases is downward through the fuel. Its object is to remedy certain difficulties in downward-draft burners.

Downward-draft burners have not yet come into general use, for various reasons. It has been necessary to start them into operation by a draft upward through the fuel to heat the air in the chimney, because the draft would not descend until forced to do so by an ascending column of heated air and gases in the pipe or chimney.

When self-feeding burners have been used, the reservoir has been placed directly above the chamber for the burning fuel, and the heat caused the gases in the reservoir above to generate too rapidly, and to escape from the top of the reservoir.

To remedy these and other defects, my invention consists of certain combinations of the elements enumerated below, and which combinations are specifically set forth at the end of this schedule: A fire-chamber, having a base-plate, inclined or otherwise, to support the fuel, said chamber being open at its top for the supply of air and at its bottom portion for the exit of the gases; a fuel-reservoir, opening into said fuel-chamber; an air-supply conduit, opening at one end into said fire-chamber at its upper portion, and at its other end opening to the atmosphere to admit air, said opening for the entrance of air being situated below the level of the fire-chamber; an exit-passage, starting at the opening at the base of said fuel-chamber and leading to the exit-pipe, to carry off the volatile products of combustion.

In order that persons skilled in the arts may make and use my invention, I will proceed to describe it, referring to the drawings, in which the same letters, wherever they occur, refer to similar parts.

Figure 1 is a vertical central section, showing, in side view, air-conduit, fuel-reservoir, exit-passage, fire or fuel chamber, register base-plate, damper in air-conduit, air-passage between the walls of the fire-chamber, to abstract heat from said walls, and to furnish heated air to the gases descending from the base of fire-chamber into exit-passage, and other details of construction. Fig. 2 is a vertical cross-section, in part, on line C D of Fig. 1. Fig. 3 is a horizontal section of Fig. 1 on line A B.

A A is an air-supplying conduit, leading from the atmosphere, at a point below the bottom of the fire-chamber and below the lowest point in the exit-passage, to the upper part of the fire-chamber. A' is the opening to air-conduit A A. *a a* is an air-passage, to supply air to the base of the fire-chamber and cool its surfaces leading from conduit A A, which takes its air from a point below the base of the fire-chamber and exit-passage; but it may have a separate connection to a point below the base of the fire-chamber and exit-opening, provided with a regulating-damper to cool the walls of the fire-chamber, and to furnish heated air to the gases from the base of said fire-chamber. B is the lower wall of the exit-passage. B' is one of the walls of the fire-chamber. B'' is the upper wall of the exit-passage, between which and B' is the air-passage *a a*. C is a cover to an opening in air-conduit A, opposite the cover C' on reservoir R. D is an ash-pan. E is the exit-passage leading from the base of the fire-chamber to the pipe P, into which the air from passage *a a* and gases from the fire-chamber descend before rising toward pipe P. G is an opening and closing base-plate to fire-chamber, which swings down to discharge the fuel, when desired. L is a notched lever, to raise and lower base-plate G and hold it in position. K is a damper or valve in air-conduit A, to regulate or close off the supply of air. *l* and *l'* are levers to operate the damper K and the register on base-plate G. P is the chimney-pipe flange. R is the fuel-reservoir, discharging into fire-chamber. S is the hinge to door O. O is a door, through which entrance is had to the base of fire-chamber, and may be used also to admit air to exit-passage to modify the draft.

The operation of my invention is as follows: The dampers are opened, the covers C and C' are removed, kindling and fuel are supplied to the fire-chamber, and, when the stove is used as a self-feeder, the reservoir R is also filled. The covers C and C' are then replaced, the fuel is ignited through door O, and the door closed. The air contained in the stove supplies combustion for a short time, and until a current is started toward the exit-pipe. If, as often happens, especially on a damp day or with a cold chimney, there is no natural draft toward the exit-passage, the smoke will rise into the fire-chamber and air-conduit A, mixing with the air therein, and will flow in this direction down to a point on a level with the opening from the base of the fire-chamber into the exit-passage, where it will enter the exit-passage and cause an ascending current, by its heat, toward the chimney, and stop the flow in the opposite direction. The outward flow having been now started, the air enters through entrance A' into and through air-conduits A A A to the fire-chamber, carrying the gases down through the fuel to the ignited fuel at its base, where they burn, and pass out through the exit-passage E. This operation continues as long as fuel is supplied.

As the entrance A' to the air-conduit A is lower than the exit from the base of fire-chamber, the gases cannot escape into the room therefrom when starting the fire, nor afterward, because the current over the reservoir carries all the gases as fast as they are generated down through the fuel. The converging walls of the fuel-chamber concentrate the air and gases in their descent, and raise them to a high temperature together, and they burn. This action prevents the escape of smoke, even with soft or bituminous fuel. The air, as it carries the gases with it down through the fuel, mixes with them, and both are heated, while descending, to the same temperature, which is necessary to perfect combustion.

It will be seen that even without a chimney-draft my stove is easily started into operation without departing from the down-draft principle. The exit-passage is made of great length to secure a large area of heating-surface.

The reservoir R is made larger at its base than at its top, that the fuel may more readily leave it. By agitating the register-plate on the base-plate G the fuel is broken up when it cakes too much, and ashes is discharged through it and the base-plate into the ash-drawer D.

To empty the fire-chamber of fuel, the lever L is released and the base-plate drops, swinging upon its upper supports or hinges. The base-plate must be kept tightly closed when the stove is in operation, as a draft of air through it or around it would interfere with the current over the top of the reservoir and fire-chamber, and prevent the downward current through the fuel. There will always be a definite amount of fuel in the fire-chamber, so that the stove cannot be choked by too great a depth of fuel. The fuel falls from the reservoir into the fire-chamber by its own gravitation; and, as the reservoir is placed off the center line of the fire-chamber, the heat from below cannot evolve the gases in it too rapidly, but the fuel remains cool until it reaches the fire-chamber.

The air passes in contact with the surfaces of the fire-chamber and reservoir, and cools them, and itself becomes heated thereby, so that a heated supply of air is furnished to the coal.

The supply of air is regulated by damper K. The draft may be modified by opening the door of the stove more or less.

A damper may be used in the exit-pipe; but it is not desirable ever to close the exit-passage.

An isinglass window may be placed in the door to the stove, or anywhere in the walls of the exit-passage.

Plate B' may be lined with any suitable non-conducting material; or it may be made double, with an air-space between, to prevent overheating. I prefer the latter, as I have found it to be sufficient.

The stove need not be made in two parts, but more can be used.

I do not confine myself to the precise shape of stove. I have made it circular, and found it to work well; but I prefer the arrangement shown as to its general features.

The air-conduit and exit-passage may take any other course, and any kind of regulators and shaking device may be used without departing from the principle of my invention.

For steam-boiler furnaces and other kinds of furnaces variations have been made, but all have the combinations hereinafter claimed and hereinbefore set forth.

Having now described my invention, what I claim as new, and desire to secure by Letters Patent, is—

1. In a fuel-burner, the combination, substantially as hereinbefore set forth, of a fire-chamber, open at its top to receive air and at its bottom for the discharge of the gases from combustion, and provided with a base-plate to support the fuel, an air-supply conduit opening into said fire-chamber at its top, and connecting said fire-chamber with the air at a point below the level of the fire-chamber, with an exit-passage leading from the base of said fire-chamber to the atmosphere or chimney, constructed and operating substantially in the manner and for the purposes set forth.

2. In a fuel-burner, the combination, substantially as hereinbefore set forth, of a fire-chamber, open near its top to receive air and at its bottom for the discharge of the gases from combustion, and provided with a base-plate to support and direct the fuel, an air-supply conduit opening into said fire-chamber near its top, and connecting it with the atmosphere below the level of the fire-chamber, a fuel-reservoir opening at its base into said fire-chamber, with an exit-passage leading from the base of said fire-chamber to the exit-pipe or chimney, constructed and operating in the manner and for the purposes set forth.

JAMES M. HICKS.

Witnesses:
 E. L. SHERMAN,
 E. M. DONNELLY.